Nov. 18, 1958    H. M. CONDON ET AL    2,860,678
APPARATUS FOR CUTTING FROZEN MEAT
Filed June 25, 1956    5 Sheets-Sheet 4
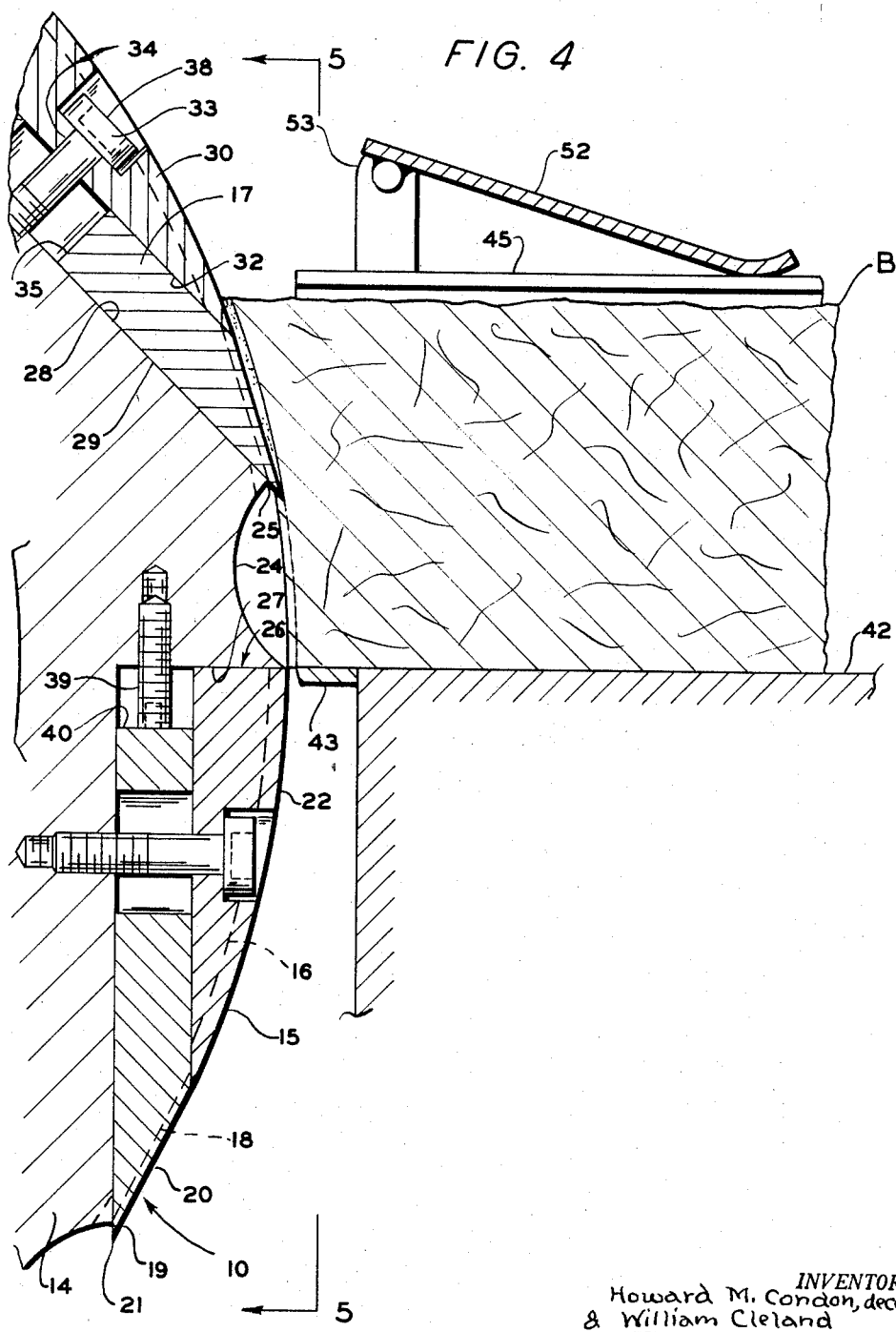
INVENTORS
Howard M. Condon, deceased
& William Cleland
BY
William Cleland
Attorney

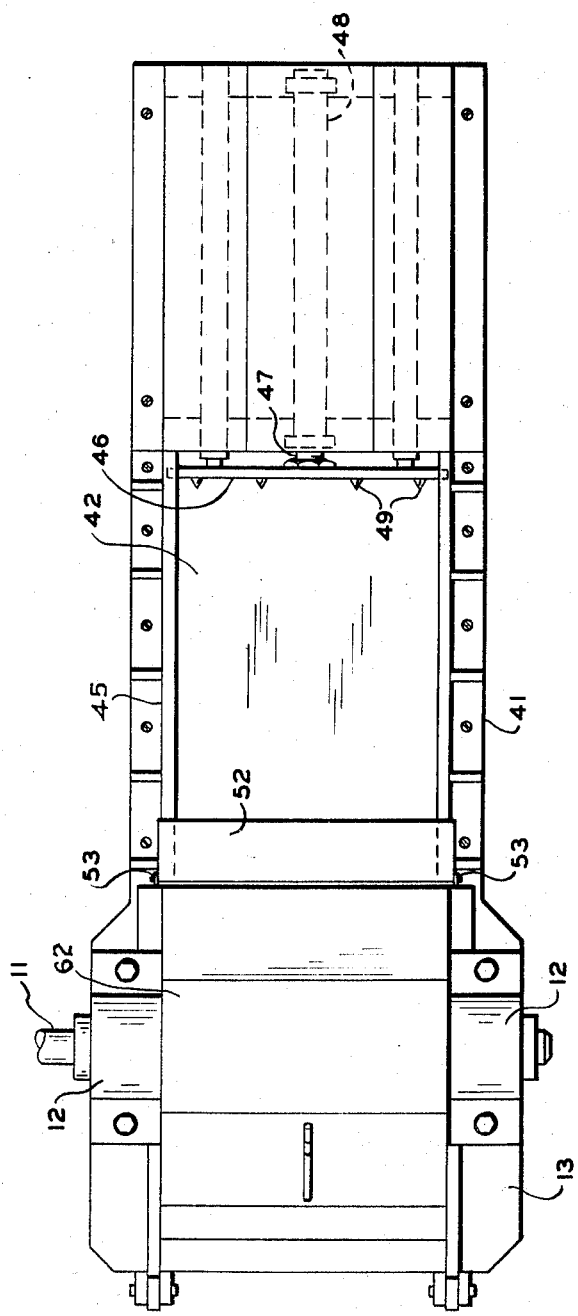

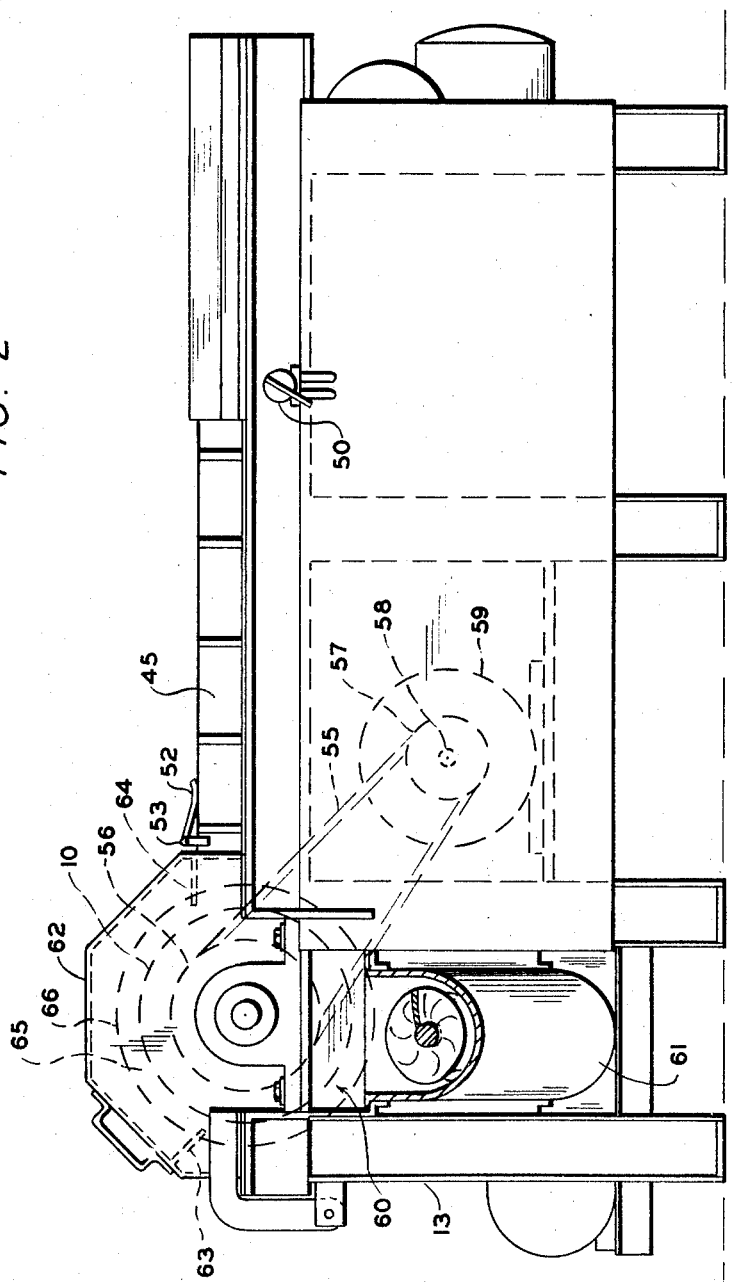

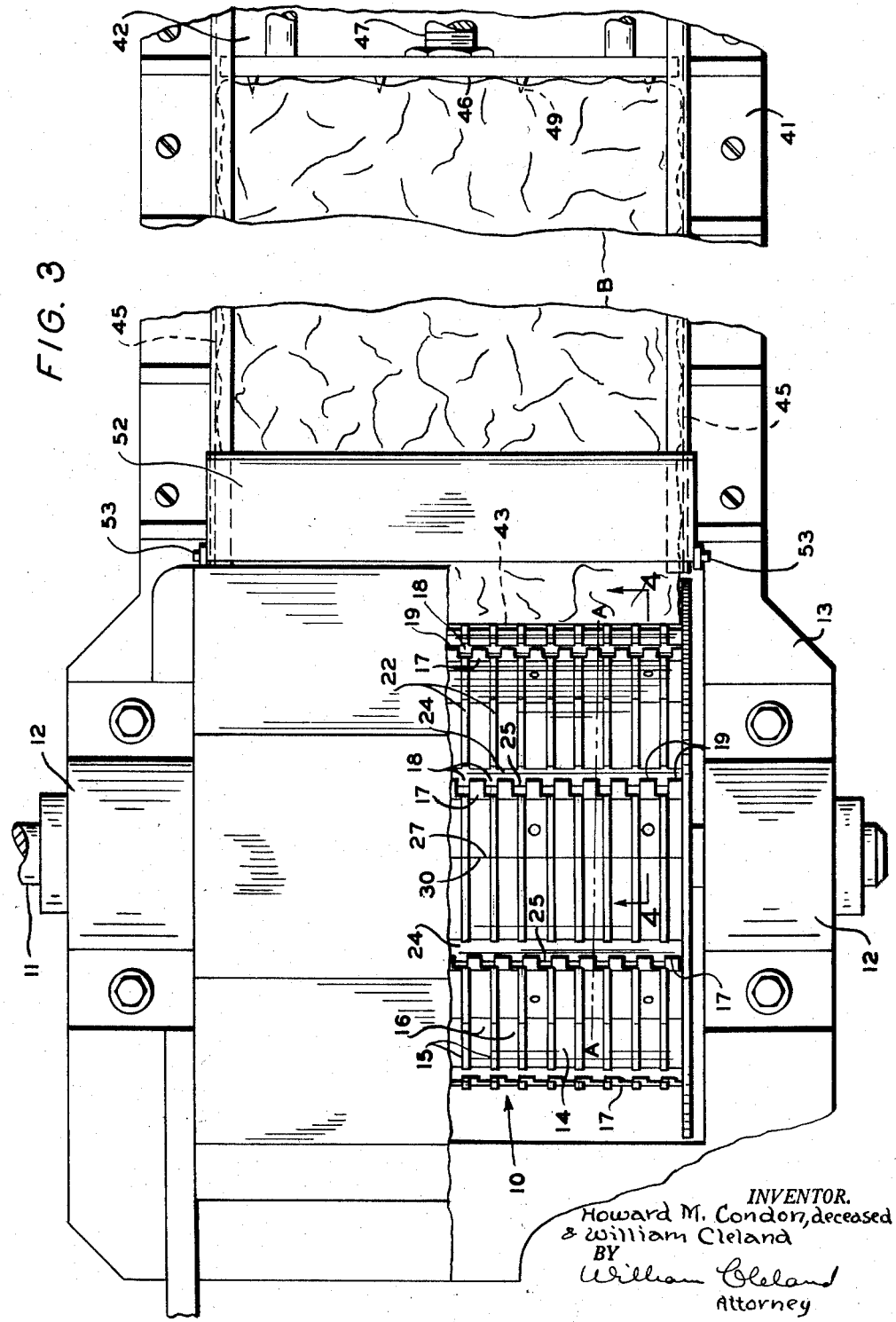

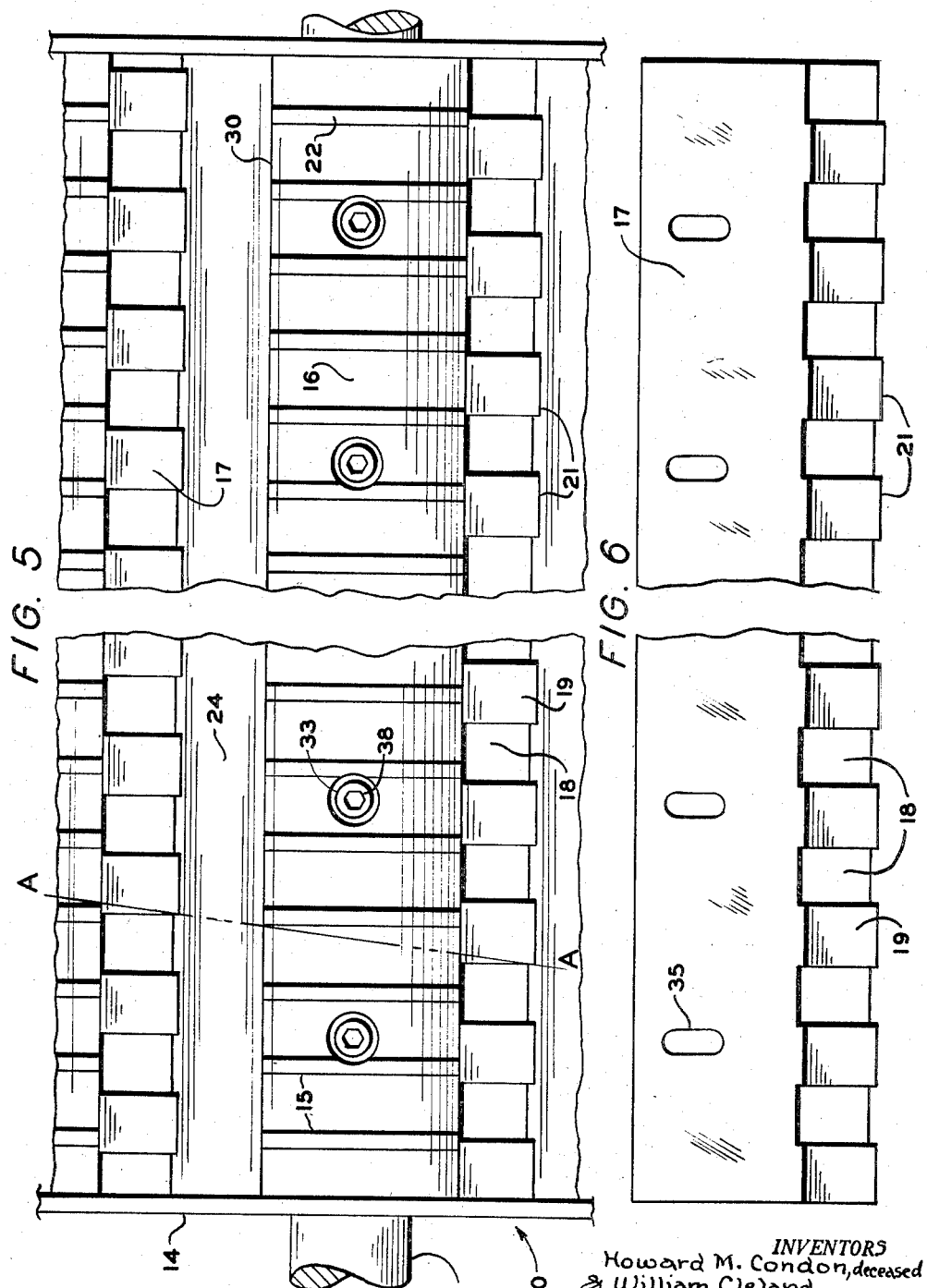

United States Patent Office 2,860,678
Patented Nov. 18, 1958

2,860,678

APPARATUS FOR CUTTING FROZEN MEAT

Howard M. Condon, deceased, late of Clinton, and William Cleland, Silver Lake, Ohio, assignors, by mesne assignments, to Merchants National Bank and Trust Company, Indianapolis, Ind.

Application June 25, 1956, Serial No. 612,078

(Filed under Rule 47(a) and 35 U. S. C. 116)

12 Claims. (Cl. 146—117)

This invention relates to a machine for cutting blocks of hard frozen meat or the like, and in particular relates to a rotary cutter for reducing blocks of hard frozen raw meat to thin flakes thereof.

Heretofore, machines have been provided for shredding, slicing or cutting various materials. These, however, have been unsuitable or inoperative for the purpose of rapidly flaking a block of frozen raw meat, as for example because no suitable way was provided for rapidly progressively moving the block to positively fixed cutting positions, and because no way was provided for preventing the cut material from clogging the cutters and generally adhering to the surface portions of the rotary cutter body.

One object of the present invention is to provide a rotary cutter of the character described including a rotary body having cutting means thereon and a relatively fixed cutter member, and wherein means is provided for rapidly progressively moving a block of hard frozen meat to positive positions with respect to relatively fixed and movable cutting edges to remove relatively small, thin flakes of meat from the block.

Another object of the invention is to provide a rotary cutting mechanism of the character described, wherein the rotary body is self-cleaning to obviate accumulation of meat particles on or around the same.

Another object of the invention is to provide a rotary cutter wherein friction between the block of frozen meat and the rotary body is reduced to a minimum, thereby correspondingly reducing any tendency toward scorching the meat due to heat of friction, and also making possible extremely rapid rotation of the machine and increasing the efficiency and productivity thereof.

Another object of the invention is to provide a rotary cutter of the character described having efficient and effective means for readily adjusting the cutting means to cut flakes of varying sizes and thicknesses from the frozen block.

Still another object of the invention is to provide a rotary cutter of the character described having simple and effective means for replacing or sharpening the cutting means without removing the rotary body or otherwise substantially dismantling the machine.

These and other objects of the invention will be manifest from the following brief description and the accompanying drawings.

Of the accompanying drawings:

Figure 1 is a top plan view, partly broken away, of a rotary meat cutting or flaking machine embodying the features of the invention.

Figure 2 is a front elevation thereof.

Figure 3 is an enlarged fragmentary plan view, partly broken away, of the left hand end portion of the machine as viewed in Figure 1.

Figure 4 is a further enlarged fragmentary cross-section of the rotary cutter, taken substantially on the line 4—4 of Figure 3.

Figure 5 is an enlarged fragmentary cross-section of the rotary cutter, taken substantially on the line 5—5 of Figure 4.

Figure 6 is a plan view of one of the knife bars of the rotary cutter.

Referring to the drawings generally, there is illustrated a machine for flaking frozen meat, embodying the features of the invention, and wherein a rotary cutter 10 is keyed on a horizontal shaft 11, journalled in spaced bearings 12, 12 mounted on a suitable supporting framework 13. The rotary cutter 10 may comprise a hollow cylindrical body 14, having means thereon providing on the surface of the same a plurality of relatively narrow peripherally extending ribs 15, 15, defining therebetween relatively narrow peripheral grooves or spaces 16, 16 of substantial depth (see Figures 3 and 4). Releasably and adjustably mounted at peripherally equally spaced points in the surface of the body 11 may be a plurality of elongated knife bars 17, 17, (see Figures 4, 5 and 6), each formed with longitudinally spaced cut-out portions 18, 18 defining spaced knife portions or teeth 19, 19 which terminate in bevelled portions 20, 20 presenting sharp cutting edges 21, 21 in the direction of rotation of the rotary cutter, which is clockwise as indicated by arrows in Figures 4 and 5, and said edges being predeterminately radially outwardly spaced from the smooth outer annular surfaces 22 of the ribs 15, as for example $\frac{1}{32}$ inch. An inwardly arcuate recess 24 may be provided axially across the periphery of the body 14 forwardly adjacent each knife bar 17, the rearmost edge 25 of the recess being slightly rearward of the cutting edges 21 to present the same substantially free and unobstructed, both for efficient cutting action and to obviate clogging of meat particles under said cutting edges.

As best shown in Figures 4 and 5, for adjustably and removably securing each knife bar 17 on the cylindrical body 14, said body is provided with an axially extending elongated recess 26 defined by right-angularly disposed flat walls 27 and 28, the latter of which lies in a plane at an acute angle to a plane tangent to the outer periphery of the body. The knife bar 17 is mounted with one flat side 29 thereof seated against the flat side 28 of recess 26, and a clamping plate 30 is clamped against an opposite flat face 32 of the knife bar, by means of bolts 33, 33 received through apertures 34, in the plate and elongated slots 35 in the knife bar and threaded into the cylindrical body. Plate 30 is shown flush with the outer periphery of body 14, and as best shown in Figures 4 and 5, the outer peripheral portions of these plates include the major proportion of the peripheral surface of the cylindrical body 10, including the peripheral ribs and grooves 15 and 16, respectively, thereof. It is understood, however, that the proportionate dimensions of the clamping plates 30 and the body 10 may be such that said ribs and grooves would be partly on each of the same, the general purpose being to provide smooth, substantially continuous, annular rib surfaces against which the leading edge of the block B may be backed and supported as the body 10 is rotated. To this end, the screws 33 are of the "allen head" type, the heads 38 thereof being recessed in the plate 30 to leave said annular surface portions 22 of the ribs free and unobstructed for smooth engagement thereof by the block of meat B, in a manner to be described later (see Figure 4).

For adjusting the depth of cuts taken from a block B treated in the machine, in conjunction with each releasable clamping plate 30 (Figure 5) suitable set screws 39 are adjustably threaded in the recess wall 27 of body 14, to have outer ends thereof in positive stop engagement with a flat inner edge 40 of the respective knife bar 17, the screw-receiving slots 35 in the knife bar permitting such adjustment of the same and the set screws 39. Thus, adjustment of the size and thickness of the flakes cut from a block B of frozen meat is easily accomplished by flatwise sliding adjustment of the knife bar between the clamping plate 30 and recess wall 28.

To assure rapid flaking of the meat block B, without substantial chattering action or vibration, the knife bars 17 are made and arranged so that laterally or axially corresponding knife edge portions 21 extend around or across the periphery of the cylindrical body 14 in series thereof defining spiral convolutions, as partially indicated at A—A in Figure 3, in which case the successive cutting edge portions 21 of each spiral series thereof may overlap each other. Satisfactory results have been attained where the overlap of such spirally arranged successive cutting edges was approximately one sixteenth inch, for example. This arrangement assures uniformly smooth, rapid cutting action to produce flakes of meat of desired uniform size and thickness, as will be described later.

At the right of the rotary cutter 10, as best shown in Figures 1 and 3, the framework 13 is extended at 41 to support a horizontal platform 42 of sheet material, such as stainless steel, having a smooth upper surface thereof in a horizontal plane substantially in line with or passing through the axis of the rotary cutter (Figures 2 and 4). A straight leading edge portion 43 of the platform 42 may serve as a relatively fixed cutter element aligned in the path of the arcuate movement of the cutting edges 21 of the knife bars 17, with suitable clearance provided for effective cutting or flaking of the block B.

For progressively urging the frozen block B between laterally spaced vertical guide walls 45, 45 on the framework extension 41, and toward stop engagement with the smooth annular rib surfaces 22 of cylindrical cutter body 14, a plunger 46 on piston rod means 47 is longitudinally reciprocable by hydraulic or fluid-pressure piston means 48, also mounted on said framework. A plurality of sharp spikes 49, 49 on the plunger project into the block to hold it downwardly against the platform 42. A control for operating the piston means 48 is indicated at 50 in Figure 2. The leading end of the block B may be prevented from riding up the cylindrical body 14, as by provision of a heavy plate 52, pivoted between lugs 53, 53 on the framework 13 to extend above the block and rearwardly or to the right of the cutter body 10, as viewed in Figures 2 and 3. The plate 52 also serves as a shield to deflect flakes or pieces of meat downwardly, should any of the same tend to be blown outwardly of the rotary body by a back-lash of wind which may be created by rapid rotation of said body.

For rotating the rotary cutter body 10 at substantially high angular velocity, such as 1750 R. P. M., V-belt means 55 (Figure 2) is extended between pulley means 56 and 57 on the rotary cutter shaft 11 and a shaft 58 of an electric motor 59, respectively.

Suitable shielding and baffle means 60 is mounted on framework 13, at the underside of the rotary cutter body 10 to deflect the flaked meat downwardly into a suitable container 61, which in the present instance is a screw conveyor which carries the flaked material toward another station (not shown) for further treatment. The upper part of the rotary cutter may be shielded by a cover 62, pivoted on framework 13 to be easily removed as for cleaning and maintenance operations on the cutter body. Baffle plates 63 and 64 within the cover 62 further tend to prevent eddying of particles of meat about the body 10.

Removably secured at each end of cutter body 10 may be a disc 65 of greater diameter than the body, thereby providing annular guide flanges 66 aligned with inner guide faces of the side walls 45 of the platform 42. These flanges 66 serve to retain the leading end of block B in cutting position, and to assist in deflecting the flaked meat downwardly into the receptacle 61. The discs 65 further assist in positioning the knife bars 17 and clamping plates 30 on the body 10, following removal of the same for a knife-sharpening operation, for example. In this regard, the knife bars 17 are individually removable, as necessary, by removing the screws 33 and clamping plate 30, and all of the teeth of each knife bar may be sharpened effectively and efficiently substantially in one operation, as by means of a suitable fixture in conjunction with a known type of sharpening device.

In use or operation of the improved flaking machine for flaking raw meat, with the motor running to rotate the rotary cutter 10 at 1750 R. P. M. for example, a block B of solid or hard frozen raw meat, such as beef, is placed on the platform B, and plunger 49 is hydraulically or fluid-pressure operated to urge the block with steady, uniform pressure toward engagement of the leading end thereof with the ribs 16 of rotary cutter. Thus, the block B is progressively fed against the backing support of the ribs 15 as the relatively narrow cutting edges 21, moving in clockwise direction as viewed in Figure 4, progressively cut relatively small, paper thin, flakes of raw meat from the block. At said speed of 1750 R. P. M., the block B of raw beef at a temperature of approximately 12° F., and measuring approximately 24" x 15" x 3½", will be reduced to flake form in little more, if any, than one minute. The size and thickness of the flakes may be varied according to the hardness of the block B, the rotary speed of the rotary cutter, the cutting depth of the knife cutting edges beyond the annular surfaces of ribs 15, the number and size of said cutting edges, and other considerations. In any event, the spiral overlapping arrangement of the series of cutting edges 21 progressively removes the flakes of meat substantially without leaving ridges on the surface of the block, and makes it possible to reduce the block to flakes of meat without particular regard to the size of the pieces of meat constituting the block B. The operation may be continued indefinitely by feeding blocks B one after the other toward the rotary cutter 10.

The flakes cut from block B by knife edges 21, against the relatively fixed cutting or shearing edges 43, are projected downwardly into the receptacle 61 within a relatively narrow projection area, defined by planes substantially tangent to the points of shearing contact with block B on the rotary cutter and forming with each other an angle approximating 35 degrees. In any event, provision of grooves 16 in the rotary cutter helps to reduce to a minimum eddy currents which may tend to blow the smaller particles of flakes upwardly of the rotary cutter. This reaction is further prevented by provision of the baffle plates 63 and 64 in the pivoted cover 62. Due to provision of the grooves 16 in the rotary cutter 10 it is self-cleaning to the extent that after long periods of use as described there will be little if any particles of meat clinging to the cutter body 14 and associated parts.

When the machine is stopped after a flaking period of operation thereof, one or more of the knife bars 17 may be quickly removed or replaced for sharpening, as previously described. That is, it is not necessary to remove the rotary cutter from the framework 13, and hence the machine is not withheld from operation for long periods of time.

Modifications of the invention may be resorted to without departing from the spirit thereof or the scope of the appended claims.

What is claimed is:

1. A rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block.

2. A rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block, said straight cutting edges being arranged in series thereof, the straight cutting edges of the respective said series thereof extending in peripherally spaced relation, said straight cutting edges of each series thereof being arranged in a spiral.

3. A rotary cutter as for thin cutting a block of hard frozen raw meat into flake-like pieces thereof, comprising a frame, a body rotatably mounted on a frame to rotate about an axis, means for rotating said body, said body having a plurality of axially spaced rylindrical surface portions in substantial axial alignment and defining peripherally extending spaces therebetween, knife means mounted on said body presenting axially spaced straight cutting edges predeterminately spaced radially outwardly of said cylindrical surface portions, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges wil progressively cut relatively thin pieces of meat from said leading end of the block, said straight cutting edges being arranged in series thereof, the straight cutting edges of the respective said series thereof extending in peripherally spaced relation, said knife edge portions of each series thereof being arranged in a spiral, each knife edge of each said spiral series being in predeterminately overlapping relation to the next adjacent knife edge of the series.

4. A rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block, said body being generally cylindrical, said knife means including a plurality of peripherally spaced blades each having at least one said knife edge portion, said body having recessed portions extending axially in the periphery of the same each defining seat means generally in a plane at an obtuse angle to a line tangent to the periphery of said body, clamping plates received in said recessed portions against said blades, releasable securing means through said plates and blades for clamping the blades to said body, the outer portions of said plates being substantially smoothly blended with the corresponding adjacent peripheral portions of said body.

5. A rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges wil progressively cut relatively thin pieces of meat from said leading end of the block, said body being generally cylindrical, said knife means including a plurality of peripherally spaced blades each having at least one said knife edge portion, said body having recessed portions extending axially in the periphery of the same each defining seat means generally in a plane at an obtuse angle to a line tangent to the periphery of said body, clamping plates received in said recessed portions against said blades, releasable securing means through said plates and blades for clamping the blades to said body, the outer portions of said plates being substantially smoothly blended with the corresponding adjacent peripheral portions of said body, said securing means for each plate comprising screws received through said plates and blades and threaded into said body, said recesses having wall portions at a substantial angle to said seats, said blades having inner edge portions oppositely spaced from said wal portions, set screw means adjustably threaded in said wall portions and having ends presented for inward stop engagement by said inner edge portions of the blades in various positions of clamped adjustment of the same.

6. A rotary cutter as for thin cutting a block of hard frozen raw meat into flake-like pieces thereof, comprising a frame, a body rotatably mounted on said frame to rotate about an axis, means for rotating said body, said body having a plurality of axially spaced, cylindrical surface ribs providing axially aligned circular surface portions and defining peripherally extending grooves therebetween, knife means mounted on said body presenting axially spaced straight cutting edges predeterminately spaced radially outwardly of said cylindrical surface ribs, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block.

7. A rotary cutter as for thin cutting a block of hard frozen raw meat into flake-like pieces thereof, comprising a frame, a body rotatably mounted on said frame to rotate about an axis, means for rotating said body, said body having a plurality of axially spaced, cylindrical surface ribs providing axially aligned circular surface portions and defining peripherally extending grooves therebetween, knife means mounted on said body presenting axially spaced straight cutting edges predeterminately spaced radially outwardly of said cylindrical surface portions, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface ribs of the rotating body, and whereby said knife edges will progressively cut relatively thin pieces of meat from said leading end of the block, said body being generally cylindrical, said knife means including a plurality of peripherally spaced blades each having at least one said knife edge portion, said body having recessed portions extending axially in the periphery of the same each defining seat means generally in a plane at an obtuse angle to a line tangent to the periphery of said body, clamping plates received in said recessed portions against said blades, releasable securing means through said plates and blades for clamping the blades to said body, the outer portions of said plates being substantially smoothly blended with the corresponding adjacent peripheral portions of said body, ribbed and grooved portions of said body being at least in part constituted in said plates.

8. A rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block, guide means on said platform, a plunger reciprocably mounted in said guide means, and means for reciprocating said plunger and forwardly operable to urge a said block of frozen meat toward backing engagement of the leading end thereof with said cylindrical surface portions of said body as the same is rotated.

9. A rotary rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block, guide means on said platform, a plunger reciprocably mounted in said guide means, and means for reciprocating said plunger and forwardly operable to urge a said block of frozen meat toward backing engagement of the leading end thereof with said cylindrical surface portions of said body as the same is rotated, said body having annular guide flanges extending radially at an angle to the axis thereof and in substantial alignment with said guide means.

10. A rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block, guide means on said platform, a plunger reciprocably mounted in said guide means, and means for reciprocating said plunger and forwardly operable to urge a said block of frozen meat toward backing engagement of the leading end thereof with said cylindrical surface portions of said body as the same is rotated, means being provided adjacent said body for holding the leading end of said block against said platform.

11. A rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block, said body being generally cylindrical, said knife means including a plurality of peripherally spaced blades each having at least one said knife edge portion, said body having recessed portions extending radially in the periphery of the same each defining seat means generally in a plane at an obtuse angle to a line tangent to the periphery of said body, clamping plates received in said recessed portions against said blades, releasable securing means through said plates and blades for clamping the blades to said body, the outer portions of said plates being substantially smoothly blended with the corresponding adjacent peripheral portions of said body, said body having narrow recessed portions in the periphery thereof coextensive with said knife edge portions of the respective said blades to present the knife edge portions substantially free and unobstructed said recessed portions being peripherally narrower than the corresponding width of the block to be cut.

12. A rotary cutter as for thin cutting a block of hard frozen raw meat into flake-like pieces thereof, comprising a frame, a body rotatably mounted on said frame to rotate about an axis, means for rotating said body, said body having a plurality of axially spaced cylindrical surface portions in substantial axial alignment and defining peripherally extending spaces therebetween, knife means mounted on said body presenting axially spaced straight cutting edges predeterminately spaced radially outwardly of said cylindrical surface portions, and a supporting platform on said frame and terminating in a relatively fixed continuous cutting edge predeterminately closely spaced from the path of said edge portions, whereby a said block supported upon said platform is adapted to have the leading end thereof urged solidly against the backing of said cylindrical surface portions of the rotating body, and whereby said knife edges will progressively cut relatively thin pieces of meat from said leading end of the block, a receptacle being provided underneath said body and deflector means being provided to deflect the cut pieces of meat into said receptacle.

References Cited in the file of this patent

UNITED STATES PATENTS

| | | |
|---|---|---|
| 1,209,319 | Mitts | Dec. 19, 1916 |
| 1,563,756 | Liberman | Dec. 1, 1925 |
| 2,275,121 | Wingate et al. | Mar. 3, 1942 |
| 2,710,635 | Alexander | June 14, 1955 |

FOREIGN PATENTS

| | | |
|---|---|---|
| 105,951 | Sweden | Nov. 17, 1942 |